March 10, 1942. S. M. ANDERSON 2,275,879
AIR CONDITIONING SYSTEM FOR PASSENGER VEHICLES
Filed Dec. 30, 1939
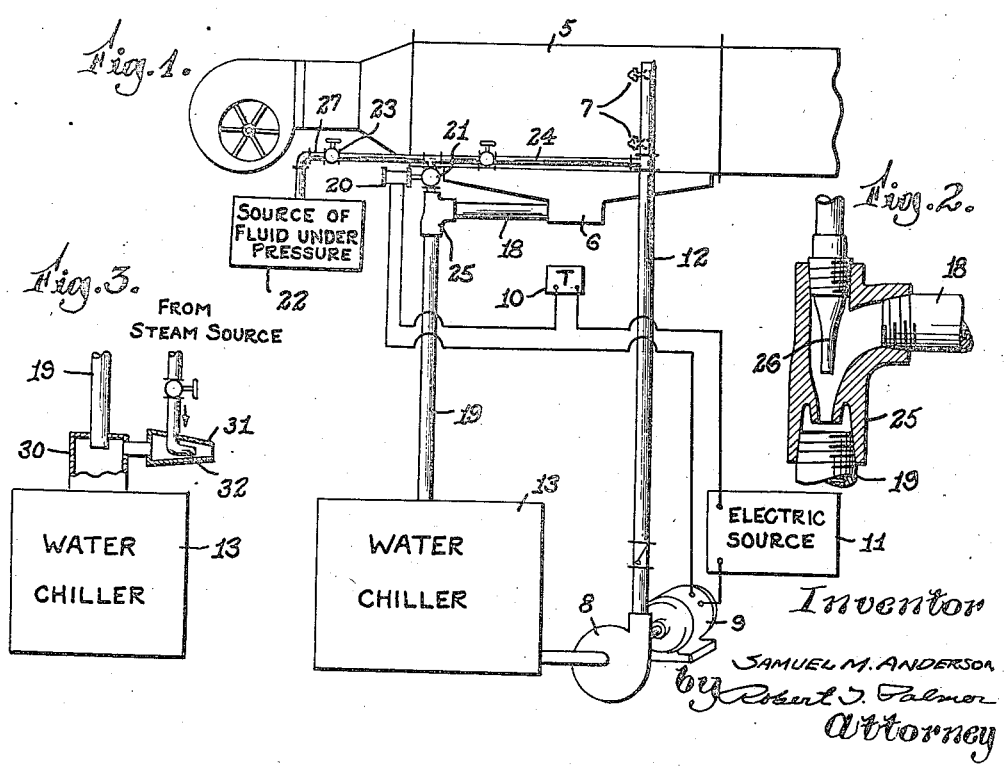
Inventor
SAMUEL M. ANDERSON
by Robert J. Palmer
Attorney Patented Mar. 10, 1942

2,275,879

UNITED STATES PATENT OFFICE 2,275,879

AIR CONDITIONING SYSTEM FOR PASSENGER VEHICLES

Samuel M. Anderson, Sharon, Mass., assignor to B. F. Sturtevant Company, Boston, Mass.

Application December 30, 1939, Serial No. 311,788

3 Claims. (Cl. 261—36)

This invention relates to air conditioning systems and relates more particularly to spray type conditioning systems for passenger vehicles.

Air washers for railway passenger cars are usually located in the roof zones of the cars with the water chillers and pumps underneath the cars. The pumps are usually under thermostatic control and are started and stopped frequently. There is difficulty in starting the water flow from the washer back to the water chiller and it is usually necessary for a relatively high water level to be built up in the sump or base of the washer before there is sufficient head to start the desired syphon action. Such high water levels are undesirable because the swaying and tilting of the cars during train movement tend to cause the water to be thrown from the washers into the passenger space.

According to this invention, means is provided for creating a partial vacuum in a water drain pipe from an air washer, whereby water is sucked from the sump of the washer when any collects there.

An object of the invention is to provide a quick action drainage system for an air washer.

Another object of the invention is to provide an improved air washer system for passenger vehicles.

Other objects of the invention will be apparent from the following description taken together with the drawing.

The invention will now be described with reference to the drawing, of which:

Fig. 1 is a diagrammatic view of an embodiment of the invention in which an ejector is provided for initiating syphon flow from an air washer;

Fig. 2 is an enlarged view in section of the ejector of Fig. 1, and

Fig. 3 is a diagrammatic view of an ejector arrangement for use with steam.

Referring now to Figs. 1 and 2, the pipe 18 from the sump 6 of the air washer 5 connects laterally into the ejector 25 and the return pipe 19 to the water chiller connects with the lower and discharge portion of the ejector. The ejector nozzle 26 is connected to a source of fluid under pressure. It may be connected by means of the pipe 24 to the pipe 12 to receive a portion of the water forced by the pump 8 to the spray nozzles 7. Alternatively it may be connected through the valve 23 and pipe 27 to the source of fluid under pressure 22. This source 22 may contain compressed air, for example.

The fluid from the source 22 or pipe 24 passes through the ejector nozzle 26 and produces a partial vacuum in the ejector 25 causing any water in the sump 6 to flow through the pipe 18 into the ejector and syphon flow to be started through pipe 18, ejector 25 and pipe 19 to the water chiller 13.

While the fluid flow through the nozzle 26 could be continuous, it is preferred that it be discontinued when it is no longer needed, a short time after the pump is started. This may be accomplished by the valve 21 and its actuating solenoid 20. The solenoid 20 is wired in series with the thermostat 10, the pump motor 9, and the electric source 11. The solenoid 20 is energized when the pump is started by the thermostat and at this time, opens the valve 21 to permit fluid under pressure to flow through the nozzle 26. At the end of say thirty seconds, the solenoid permits the valve 21 to close. When, however, the thermostat 10 is satisfied and opens the circuit of the pump motor 9 and solenoid 20, the solenoid 20 re-sets itself to be prepared to again open the valve 21 when the solenoid is again energized. Such solenoid actuated valves are well known and in general use and so will not be illustrated or described in detail herein.

Fig. 3 illustrates an arrangement for using steam for creating the desired suction. While steam could be used with the arrangements of Figs. 1 and 2, this would be inefficient for the steam would add heat to the water. In Fig. 3, the water chiller 13 is provided with the stand-pipe 30 into which the pipe 19 drains. The ejector 31 is connected to the stand-pipe 30 and steam from the engine or other source is passed through the nozzle 32 and then discharged into the atmosphere. Its action creates a suction in the stand-pipe 30 and pipe 19 causing any accumulated water in the sump 6 to flow downwardly through the pipe 19.

While several embodiments of the invention have been described for the purpose of illustration, it should be understood that the invention is not limited to the exact apparatus or arrangement described, as many departures may suggest themselves to those skilled in the art without departing from the spirit of the invention.

What is claimed is:

1. Air conditioning apparatus comprising an air washer having a sump, means including a pump for supplying water to said washer, a pipe for draining water by gravity from said sump, a source of fluid under pressure, means utilizing fluid from said source for producing a suction by ejector action in said pipe for initiating the flow of water therethrough, and thermostatically controlled means for energizing said pump and said last mentioned means.

2. Air conditioning apparatus comprising an air washer having a sump, a pump for supplying water to said washer, a pipe line for draining water by gravity from said sump, an ejector in said pipe line, and means for supplying water from said pump to said ejector to produce a suction in said pipe line for initiating the flow of water therethrough.

3. Air conditioning apparatus comprising an air washer having a sump, a pump for supplying water to said washer, a pipe line for draining water by gravity from said sump, an ejector in said pipe line, a source of fluid under pressure, means for supplying fluid from said source to said ejector to produce a suction in said pipe line for initiating the flow of water therethrough, and means simultaneously actuated for energizing said pump and said last mentioned means.

SAMUEL M. ANDERSON.